3,327,866
WOVEN WIRE MESH
David B. Pall, Roslyn Estates, and Richard Ray, Bethpage, N.Y., assignors to Pall Corporation, Glen Cove, N.Y., a corporation of New York
Filed June 15, 1964, Ser. No. 375,024
18 Claims. (Cl. 210—499)

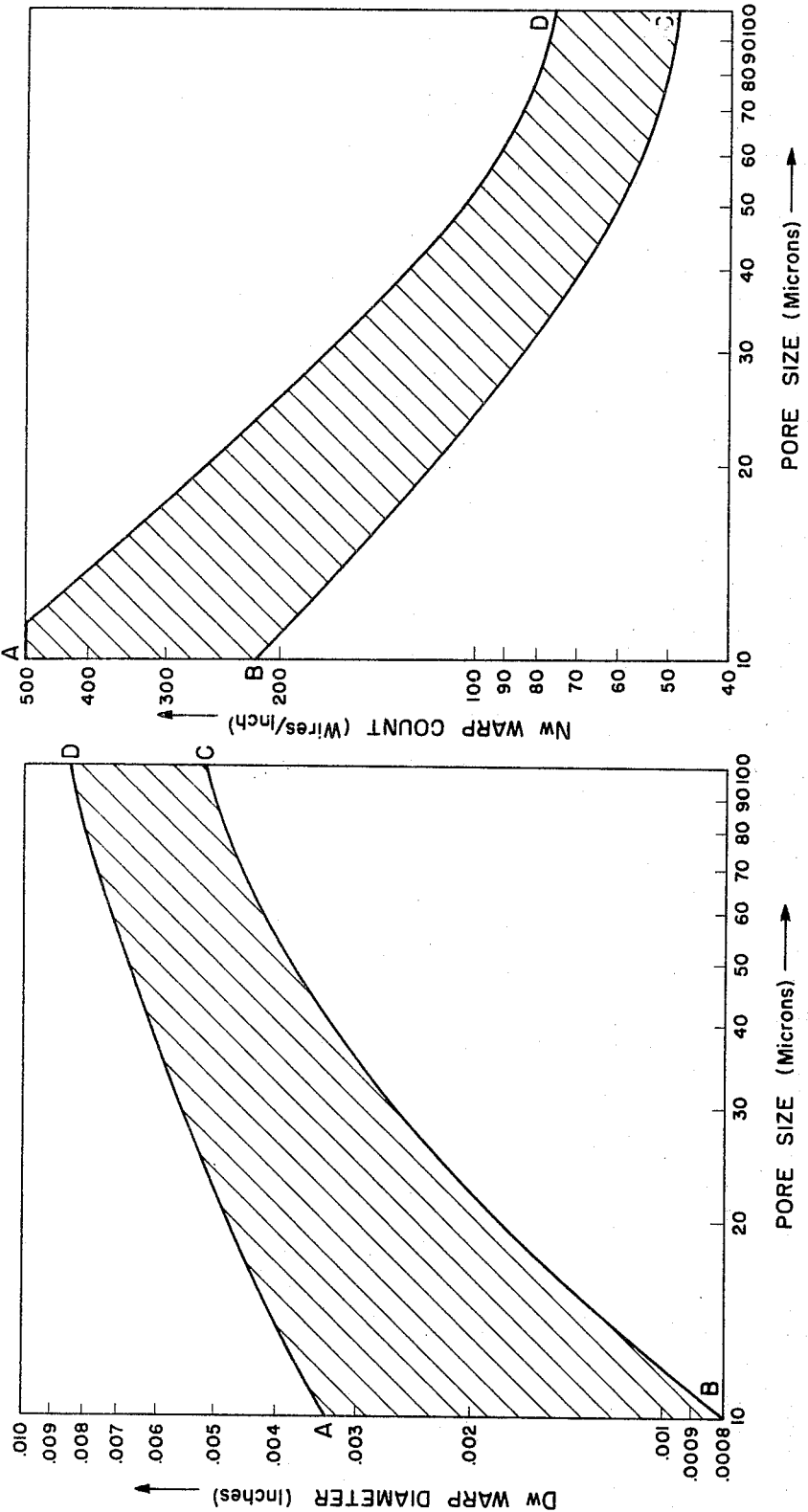

This invention relates to woven wire mesh, particularly useful as filter elements, and more particularly to woven wire sheet material formed of interwoven metallic filaments and preferably treated by controlled interrelated deforming and sintering operations.

Woven wire mesh have been in use for some years as filter materials. We have the advantages of being readily available, permitting close control of uniformity in the number, size and shape of the pores, and in tensile strength, as well as being adapted for fabrication and being relatively low in cost. Various forms of such materials have been provided, ranging from the woven wire mesh as commercially available, to wire mesh specially treated so as to better suit them for filter uses.

U.S. Patent No. 2,423,547 to Behlen, dated July 8, 1947, suggests rolling a wire mesh to form a flat sheet, and thereby produce a filter or screen material having a reasonably smooth surface, analogous to a perforated sheet material prepared by drilling holes in a metallic sheet in the desired pattern. However, such screens have the disadvantage that the dirt capacity is very greatly reduced, as compared to the woven wire mesh starting material.

The amount of dirt that can be taken up by a filter before it is effectively clogged is referred to as the dirt capacity of the filter, and this can be measured in various ways. For reference purposes, it is usually expressed in terms of grams of standardized dirt per unit surface area of the filter, as determined by a standardized test procedure.

The Pall Patents Nos. 2,925,650 and 3,049,796 describe and claim woven wire sheet material specially treated by sinter-bonding, with a slight or great deformation of the wires at their points of crossing, which possess several advantages over the Behlen material. Not only are the wires held against a relative shift in position during treatment, because of the sintering operation, but the material also retains much of the nature of the starting wire mesh, and therefore much if not all of the original dirt capacity.

Nonetheless, one of the difficulties in using woven wire mesh-type filters is their relatively low dirt capacity, as compared to other filter materials. Filter media can generally be classified as being one of two types, depth filters and surface filters.

A depth filter removes suspended material from the fluid passed through the filter by collecting it not only on the surface of the element but also within the pores. A depth filter has a considerable thickness, and has a plurality of pores of distinct length. The longer the pores, the higher the dirt capacity of the filter, because there is more room for dirt along the pores. Most depth filters are made of masses of fibers, or other particulate material, held together by mechanical means or by bonding. One or several layers of such materials can be employed, and these layers can vary in porosity. In most cases, however, the greater percentage of contaminants unable to pass through the filter is trapped at the surface of the filter.

A surface filter removes suspended material from the fluid passed through the filter by collecting such material on its surface, and the material thus removed forms a filter cake or bed upon the filter. This material naturally obstructs the openings in the surface of the filter, because the fluid must flow through this material, which thus effectively reduces the diameter of the filter openings to the size of the pores in the filter cake. This reduction in effective diameter of pore openings in the filter increases the pressure differential required to maintain flow through the filter.

Woven wire mesh filters of the square weave type fall in the category of surface filters because of the depth of the pores through the sheet is substantially no greater than the diameter of the filaments making up the weave. Consequently, these filters have a rather limited dirt capacity as compared to depth filters.

Woven wire mesh is available in a variety of weaves other than a square weave. Twill weaves are available and these can also be fabricated in deformed and in sintered condition as is taught in Patent Nos. 2,423,347, 2,925,650 and 3,049,796. Such weaves give mesh having a greater depth than a square weave mesh but in general the dirt capacity of twill mesh has not been found to be superior to that of a square weave material.

In accordance with the invention, it has now been determined that by an appropriate selection of wire size and wire count, in both warp and shoot, it is possible to formulate to any specified pore size Dutch twill weave woven wire mesh of extraordinarily high dirt capacity, as compared to Dutch twill weave wire mesh woven of wires of other sizes and/or counts.

The parameters determative of high dirt capacity in accordance with the invention are the following:

TABLE I

| Parameter: | Symbol |
|---|---|
| (1) Warp wire diameter, inches | $D_w$ |
| (2) Warp wire count | $N_w$ |
| (3) Shoot wire diameter, inches | $D_s$ |
| (4) Shoot wire count | $N_s$ |
| (5) Shoot product of shoot wire count and diameter | $N_s D_s$ |
| (6) Warp product of warp wire count and diameter | $N_w D_w$ |
| (7) Product of sum of warp wire and shoot wire diameters and warp wire count | $N_w(D_w+D_s)$ |

The values of these variables are selected according to the pore size desired in the woven wire mesh. To obtain a mesh of optimum dirt capacity in accordance with the invention, one determines the pore size that is required, and then selects the remaining determinative variables accordingly.

The ranges of determinative variables for several representative pore sizes are listed in Table II. It will be appreciated that for pore sizes intermediate these, the determinative variable can be obtained readily from the graphs shown in the drawings. These graphs are plotted on a logarithmic scale from the data in the working Examples 1 to 78, as shown in Tables III and IV, and enable the determination of the parameters for a woven wire mesh of any desired pore size, simply by reference to the shaded area values for such pore size in each of the graphs of FIGURES 1 to 7, inclusive. The dirt capacity will then be as given in the graphs of FIGURE. 8.

tionship between the size and relative numbers of warp and shoot wires in the weave, and the irregularly shaped pores extending through the material.

TABLE II

| Variable | Ranges of Values of the Determinative Variables According to Desired Pore Size of Mesh | | | |
|---|---|---|---|---|
| | 10μ | 20μ | 40μ | 80μ |
| $D_w$ | 0.0008 to 0.0034 | 0.0018 to 0.0048 | 0.0033 to 0.0064 | 0.0049 to 0.0082. |
| $N_w$ | 215 to 500 | 115 to 265 | 68 to 130 | 50 to 80. |
| $D_s$ | 0.0005 to 0.0015 | 0.00073 to 0.0015 | 0.0011 to 0.002 | 0.0014 to 0.0034. |
| $N_s$ | 1,200 to 4,000 | 1,150 to 4,000 | 770 to 1,500 | 400 to 900. |
| $N_s D_s$ | 1.25 to 2.6 | 1.1 to 2.6 | 1.0 to 2.1 | 1.0 to 1.6. |
| $N_w D_w$ | 0.36 to 0.70 | 0.36 to 0.65 | 0.36 to 0.43 | 0.36 to 0.41. |
| $N_w(D_w+D_s)$ | 0.64 to 0.9 | 0.5 to 0.9 | 0.45 to 0.60 | 0.42 to 0.58. |
| Available Dirt Capacity (g./ft.²) | Above 3.1 | Above 8.3 | Above 22.5 | Above 28.* |

*Using A-C coarse test dust.

The variation of these parameters in the woven wire mesh of the invention is best seen when plotted on a full logarithmic scale, in the graphs reproduced in the drawings, in which:

FIGURE 1 represents a graph of the optimum warp wire diameter range variation with pore size;

FIGURE 2 represents a graph of the optimum warp wire count range variation with pore size;

Figure 4:
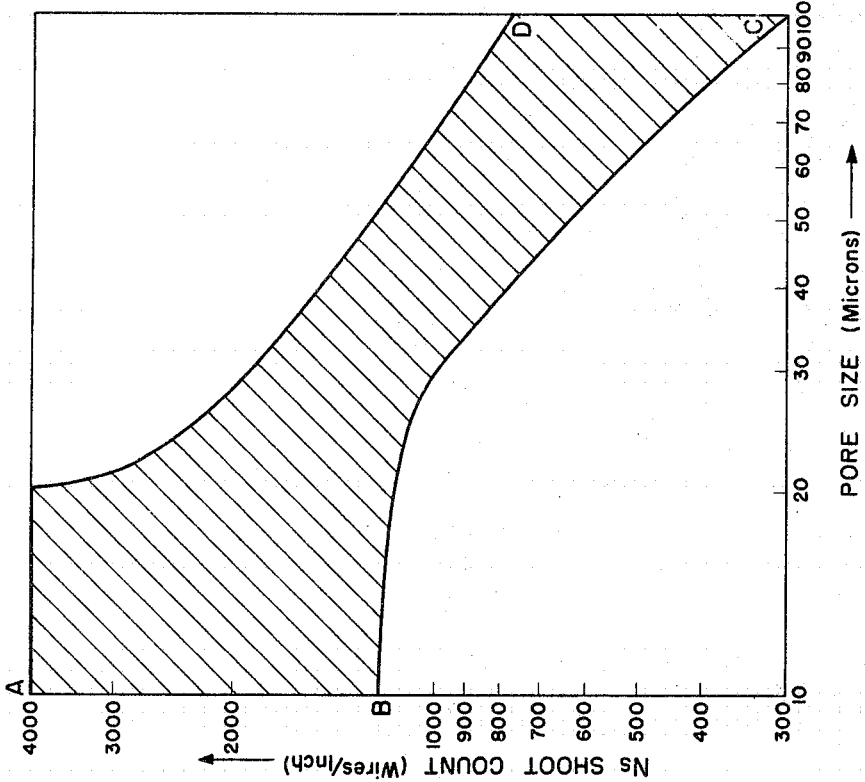
FIGURE 4 represents a graph of the optimum shoot wire count range variation with pore size.
Figure 3:
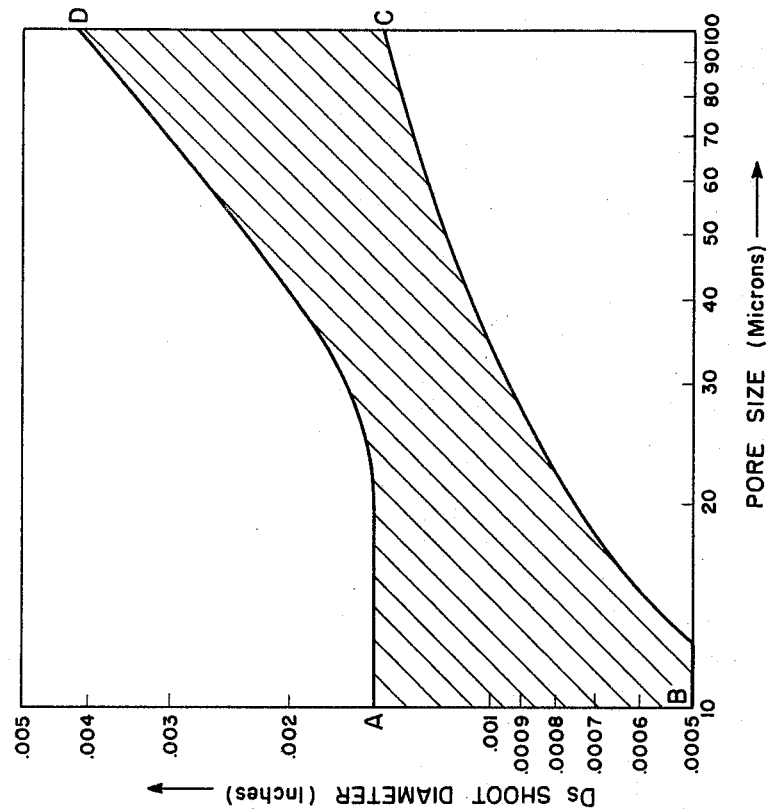
FIGURE 3 represents a graph of the optimum shoot wire diameter range variation with pore size.
Figure 5:
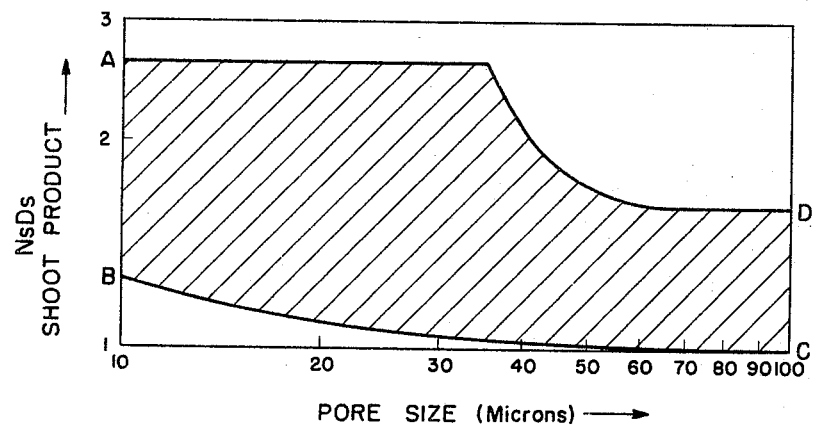
FIGURE 5 represents a graph of the optimum shoot product $N_sD_s$ range with pore size.
Figure 6:
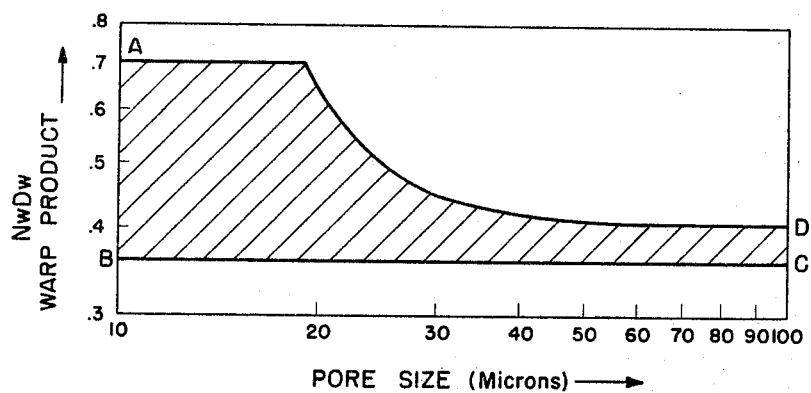
FIGURE 6 represents a graph of the optimum warp product $N_wD_w$ range with pore size.
Figure 7:
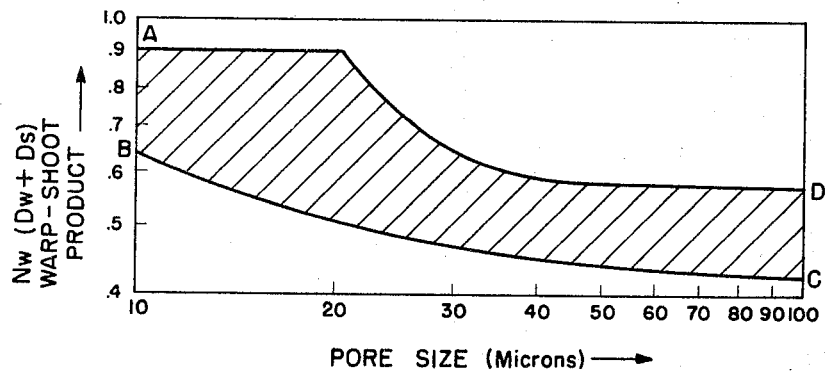
FIGURE 7 represents a graph of the warp—shoot product $N_w(D_w+D_s)$ range with pore size.
Figure 8:
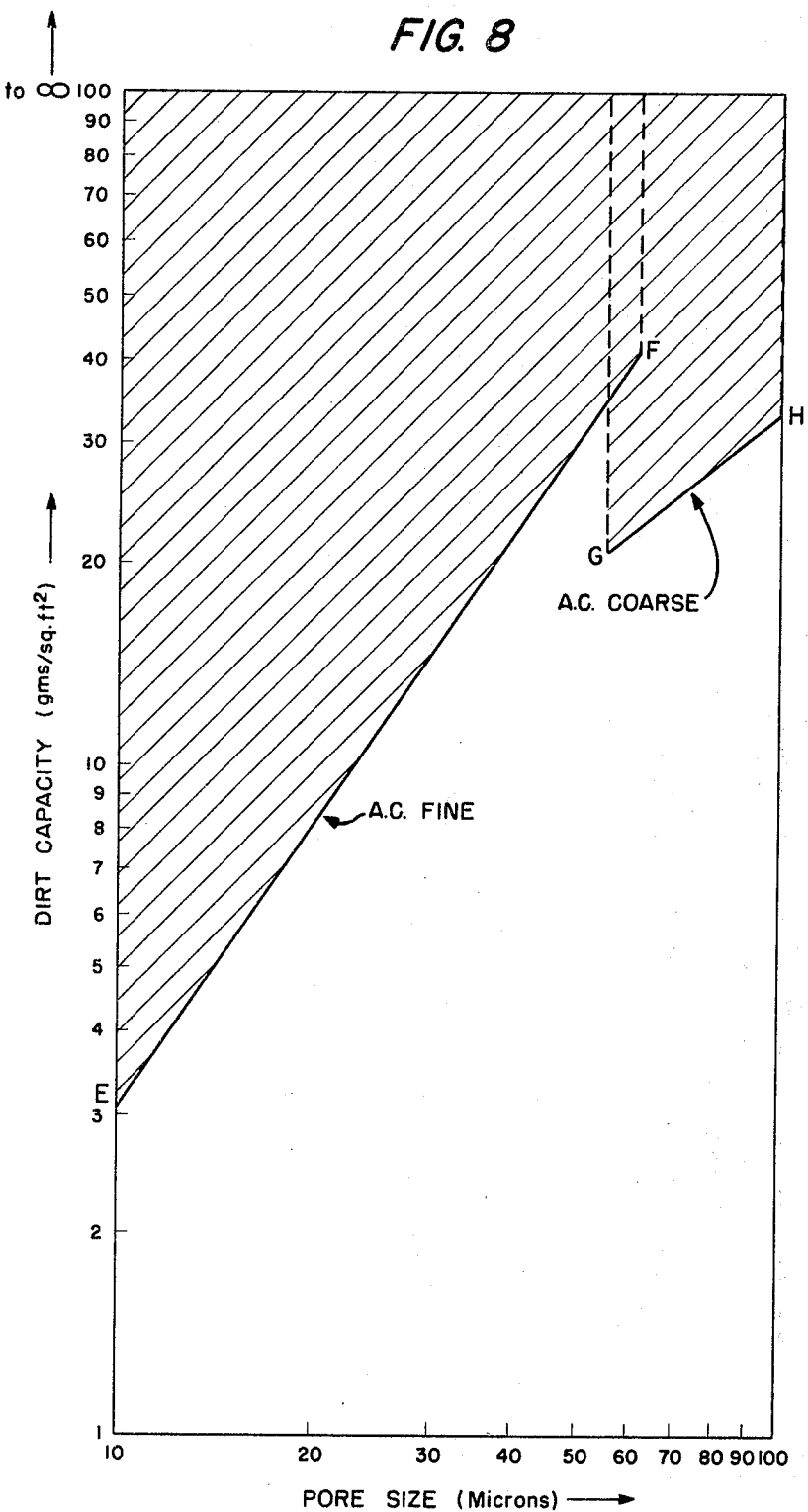
FIGURE 8 represents a graph of the dirt capacity variation with pore size.

The shaded areas ABCD of each of FIGURES 1 to 7, inclusive, represent the limits of these parameters for mesh of optimum dirt capacity falling above the curves EF and GH of FIGURE 8, in accordance with the invention.

It is apparent from the graphs that as pore size increases, the size of the warp and shoot wires also must be increased, for optimum dirt capacity, while the wire count in both warp and shoot must be decreased. The general trend of this compound variation is shown by the warp product and shoot product values, the optimum values of the shoot product and warp product decreasing slightly with increase in pore diameter.

These values are entirely empirical, based on experimental data obtained from the woven wire mesh shown in the examples. While the data show the correlation noted above, and enable the accurate prediction from the shaded areas of the graphs of the warp and shoot wire specifications required of a mesh to obtain optimum dirt capacity, no reason can at present be advanced to explain the correlation.

However, Dutch twill weave woven wire mesh falling within these limits have a considerably higher dirt capacity than Dutch twill weave mesh having the same diameter of pores but made of wires and/or to wire counts outside these limits.

Figure 9:
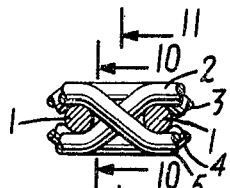

The reason for the greater dirt capacity of the Dutch twill weave mesh of the invention also is not fully understood. A Dutch twill weave mesh has tortuous pores of a definable length extending from surface to surface, longer than in a square or twill weave mesh. It is assumed that the dirt capacity is directly correlated with the length and configuration of the through pores extending from surface to surface of the mesh. However, it has not yet been possible to visualize spatially and from this to compute mathematically a pore size and configuration giving optimum dirt capacity, because of the complex rela- The complexity of the analysis is evident from FIGURES 9 to 11 of the drawings in which:

FIGURE 9 represents an enlarged cross-sectional view through a Dutch twill weave woven wire mesh in accordance with the invention.

Figure 10:
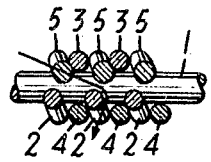

FIGURE 10 represents a perspective view taken along the lines 10—10 of FIGURE 9.

Figure 11:
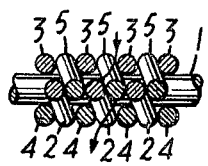

FIGURE 11 represents a perspective view taken along the lines 11—11 of FIGURE 9.

Figure 12:
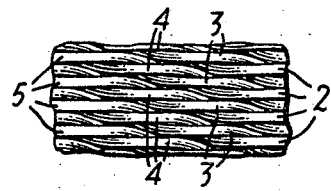

FIGURE 12 represents a top view of the mesh of FIGURE 9.

In these drawings, the arrowed lines indicate the direction of one typical through pore, and make clear the tortuousness of the pore. The mesh of FIGURE 9 is composed of warp wires 1, interwoven with shoot or weft wires 2, 3, 4, 5. In a Dutch twill weave, alternate pairs of shoot wires pass over and under the warp wires, which are of a different size, and these pairs alternate, with each successive shoot wire being displaced either one wire to the right or one wire to the left, as desired, and thus producing the twill effect. Such a weave is obtained by weaving the shoot wires over two and under two succeeding warp wires, changing these pairs with each successive shoot wire by displacing one wire to the right or to the left. The result is the diagonal surface effect characteristic of a twill weave.

A typical pore at one portion of the mesh is shown in FIGURE 10. Another view of the pore is shown in FIGURE 11. Here, the pore begins over shoot wire 5, and then between wires 2 and 5 at the center of the mesh, ending over the surface of wire 2.

The tortuousness of the pore is in direct contrast to the pores through a square weave mesh, which are of the straight-through variety. The naked eye can see straight through a square-weave screen material, for instance, if the pores are sufficiently large, but this is not true of a Dutch twill weave material, except when the wires and angled pores are exceptionally large, and even in this case, one sees straight through only a small part of the angled open pore area of the mesh.

The Dutch twill weave wire mesh of the invention can be woven of wires of any metal. For filter uses, metals which are inert to and non-corroded by the fluid being filtered are of course preferred. Stainless steel is a very suitable material. Aluminum, brass and bronze wires can also be used. Other wires that are useful include copper, iron, steel, Monel metal, tantalum, colombium, titanium, tungsten, nickel-chromium alloys, chromium-plated wires of all types, zinc-plated wires of all types, and cadmium-plated wires of all types. These can be woven using conventional textile weaving machinery to mesh of the required wire counts, wire diameters, and pore sizes.

The wires are usually monofilaments. These wires are preferred for filter uses. The wires can be of any cross-sectional configuration, such as round, square, polygonal, elliptical and rectangular. Stranded multi-filament wire can be used.

Woven wire mesh in a Dutch twill weave can be used as filters without modification, and will demonstrate the unusually high dirt capacity characteristic of the mesh of the invention. The mesh can also be specially treated to improve their usefulness for specific purposes. They can, for example, be rolled, in accordance with the process described in U.S. Patent No. 2,423,547 to Behlen. They can also be sintered by passing through a furnace in a non-oxidizing atmosphere, such as, for example, in a reducing atmosphere of hydrogen, carbon monoxide, or mixtures thereof; or in an inert atmosphere such as nitrogen, argon, helium, or combinations thereof; or in a vacuum. The furnace is brought to such a temperature, that the mesh is heated to a temperature not exceeding approximately 20° less than the melting point of the metal of which the filaments are formed. Generally, the temperature will be in excess of 1000° F. The result is a sintered integration of the metal at the points of crossing of the wires. If during sintering a slight pressure is applied, of the order of 5 lbs. per square foot or higher, the wires will also be deformed at their points of crossing, and their area of surface contact at these points enlarged, so as to improve the strength of the sinter bond.

The mesh can also be subjected to a deforming pressure of the order of 5000 to 200,000 lbs. per square inch, the pressure applied depending upon the ductility of the metal, and applied normal to the metal surface, as by rolling or coining, to reduce the thickness of the sheet. Such a process results in a permanent deformation of the sheet by flattening the undulations of the interwoven filaments in the two faces of the mesh, and forcing flattened material to encroach upon the holes in the mesh, to decrease their size in precisely controlled amounts, while increasing the contiguous or contacting surfaces between the interwoven warp and shoot filaments. The enlargement of these surfaces also improves the sinter-bonding at the points of crossing of the wires. However, to the extent that the deformed wires encroach upon the pores and change their configuration, the dirt capacity of the sheet may be considerably reduced. Nonetheless, the dirt capacity of such a sheet will be greater than that of an otherwise similar Dutch twill weave mesh woven to a wire count and/or using wires of a diameter outside the limits of this invention.

It is sometimes advantageous for some filter uses to interweave magnetic wires with non-magnetic wires in the mesh of the invention. Such a configuration produces a filter which is of enhanced effectiveness in removing fine magnetic particles. The entire cloth can be woven of magnetic wires, if desired, or the magnetic wires can be used as warp or shoot, as may be desired, interwoven with a non-magnetic shoot or warp. In some cases, it may be useful to alternate magnetic wires with non-magnetic wires in the warp and/or shoot.

The wire mesh of the invention can be used as filters in single or multiple layers, and such multiple layers can be of the same type mesh, or any combinations of plain, twill, or Dutch twill weave and pore diameter mesh, whether in accordance with the invention or not. The mesh can be juxtaposed with the layers oriented similarly or at an angle to each other. Many combinations of plural layers will thus be apparent.

The layers can if desired be bonded by welding, brazing, soldering and sintering, or by use of resinous bonding agents, or they may be mechanically interlinked or interleaved or interlocked.

As one or several of the juxtaposed layers there can also be used metal plates or sheets, which can be perforated or imperforate, and which can be bonded thereto as indicated above. A layer of metal powder can be dusted into the mesh or superposed on one or both surfaces thereof, and bonded thereto, for example in accordance with U.S. Patent No. 3,061,917, dated Nov. 6, 1962.

The mesh can also be impregnated and/or coated with fibrous material such as inorganic, metallic or organic fibers, as disclosed for instance in Belgian Patents Nos. 625,893 and 635,866, French Patent No. 1,318,029, and in U.S. Ser. No. 74,130 filed Dec. 6, 1960, now allowed.

The following examples in the opinion of the inventors represent preferred embodiments of their invention.

*Examples 1 to 66*

A group of wire mesh was prepared made of stainless steel wire, to counts and wire diameters as noted in Table III below. These mesh were woven in a Dutch twill weave.

The dirt capacity of these wire mesh was determined in acordance with the following test procedure, which represents a modification of the procedure of Military Specification MIL–F–8815A. A wire mesh section approximately 30 inches x 1.8 inches was put in a pressure build-up and collapse pressure apparatus, as defined in Sections 4.6.2.7 of MIL–F–8815A, Aug. 14, 1963. Hydraulic fluid conforming to Specification MIL–H–5606, without free water, was run through the mesh, while standardized fine air cleaner (A–C) test dust in a slurry was added through the dust valve in 0.2 gram increments at four-minute intervals. The clean-up filter was not bypassed during this test. Two minutes after each test dust addition, the pressure differential at rated flow through the apparatus was recorded. Contaminant was continued to be added in the same manner until a differential pressure across the mesh of 40 p.s.i. was reached, at a flow rate of 33 gallons per minute per square foot. The total amount of test contaminant added through the dust valve to produce the 40 p.s.i. differential pressure divided by the mesh specimen area in square feet is called the dirt capacity.

The mean pore size was determined at 70° F. under atmospheric pressure by the bubble point method of U.S. Patent No. 3,007,334 using denatured ethyl alcohol. The air pressure was increased until air bubbles appeared over substantially the entire surface of the mesh. The mean pore size was computed using the equation:

$$D = \frac{K}{P}$$

where $D$=pore diameter (microns); $P$=pressure in inches of water at the point where bubbles covered substantially the entire surface of the mesh. The value of K is 238 in this case, for the system stainless steel wire-ethyl alcohol at 70° F.

TABLE III

| Example Number | $N_w$ | $N_s$ | $D_w$ | $D_s$ | $N_w D_w$ | $N_s D_s$ | $N_w(D_s+D_w)$ | Dirt Capacity (g./ft.²) | Mean Pore Size (Microns) |
|---|---|---|---|---|---|---|---|---|---|
| 1 | 90 | 1,035 | 0.0043 | 0.00158 | 0.3870 | 1,635 | 0.529 | 29.5 | 41.5 |
| 2 | 91 | 752 | 0.0044 | 0.0020 | 0.4004 | 1.504 | 0.582 | 27 | 43.3 |
| 3 | 90 | 1,253 | 0.00435 | 0.00113 | 0.3915 | 1.416 | 0.492 | 31 | 43.5 |
| 4 | 89 | 1,250 | 0.00435 | 0.00122 | 0.3871 | 1.52 | 0.496 | 31 | 45.2 |
| 5 | 90 | 968 | 0.0044 | 0.00148 | 0.396 | 1.432 | 0.529 | 35 | 45.5 |
| 6 | 90 | 1,195 | 0.0044 | 0.0015 | 0.396 | 1.79 | 0.531 | 24.5 | 36.3 |
| 7 | 110 | 960 | 0.0034 | 0.0015 | 0.374 | 1.44 | 0.540 | 23.5 | 38.4 |
| 8 | 110 | 880 | 0.0034 | 0.0015 | 0.374 | 1.42 | 0.540 | 26.5 | 37.6 |
| 9 | 91 | 1,000 | 0.0044 | 0.00147 | 0.40 | 1.47 | 0.534 | 25.4 | 40.3 |
| 10 | 90 | 971 | 0.0044 | 0.00155 | 0.396 | 1.51 | 0.536 | 34.5 | 44.7 |
| 11 | 90 | 1,110 | 0.00445 | 0.00123 | 0.405 | 1.36 | 0.512 | 31.5 | 47.3 |
| 12 | 91 | 1,120 | 0.0044 | 0.00147 | 0.396 | 1.64 | 0.534 | 24.8 | 38.4 |
| 13 | 90 | 1,560 | 0.0045 | 0.0012 | 0.405 | 1.87 | 0.513 | 21 | 35.4 |
| 14 | 90 | 960 | 0.0044 | 0.0015 | 0.396 | 1.44 | 0.531 | 33.5 | 43.3 |

TABLE III—Continued

| Example Number | $N_w$ | $N_s$ | $D_w$ | $D_s$ | $N_wD_w$ | $N_sD_s$ | $N_w(D_s+D_w)$ | Dirt Capacity (g./ft.$^2$) | Mean Pore Size (Microns) |
|---|---|---|---|---|---|---|---|---|---|
| 15 | 90 | 970 | 0.0045 | 0.0014 | 0.405 | 1.36 | 0.531 | 29 | 45.3 |
| 16 | 165 | 1,285 | 0.00268 | 0.00107 | 0.442 | 1.375 | 0.618 | 16.4 | 29.0 |
| 17 | 90 | 1,385 | 0.0045 | 0.0014 | 0.405 | 1.939 | 0.531 | 17.0 | 30.8 |
| 18 | 89 | 1,475 | 0.0043 | 0.0014 | 0.382 | 2.065 | 0.517 | 17.7 | 31.2 |
| 19 | 111 | 2,140 | 0.00353 | 0.00094 | 0.392 | 2.01 | 0.496 | 12.6 | 24.8 |
| 20 | 110 | 1,925 | 0.0035 | 0.00112 | 0.385 | 2.16 | 0.51 | 13.8 | 28.0 |
| 21 | 90 | 1,560 | 0.0045 | 0.0015 | 0.405 | 2.34 | 0.54 | 21.0 | 35.4 |
| 22 | 90 | 1,184 | 0.0044 | 0.0015 | 0.396 | 1.79 | 0.53 | 25.0 | 36.2 |
| 23 | 90 | 1,320 | 0.0045 | 0.0015 | 0.405 | 1.98 | 0.54 | 18.0 | 32.0 |
| 24 | 90 | 1,312 | 0.00455 | 0.00147 | 0.405 | 1.95 | 0.54 | 22.5 | 36.0 |
| 25 | 171 | 2,176 | 0.0026 | 0.00101 | 0.444 | 2.197 | 0.633 | 7.9 | 17.3 |
| 26 | 162 | 2,180 | 0.00239 | 0.00107 | 0.387 | 2.332 | 0.562 | 8.4 | 17.3 |
| 27 | 166 | 2,240 | 0.00268 | 0.00094 | 0.445 | 2.105 | 0.604 | 9.0 | 17.3 |
| 28 | 165 | 2,176 | 0.0025 | 0.00105 | 0.412 | 2.284 | 0.585 | 7.5 | 17.4 |
| 29 | 180 | 2,320 | 0.00245 | 0.00094 | 0.441 | 2.180 | 0.610 | 9.5 | 17.7 |
| 30 | 170 | 2,326 | 0.00242 | 0.00094 | 0.411 | 2.186 | 0.571 | 9.6 | 17.8 |
| 31 | 168 | 2,048 | 0.00255 | 0.00107 | 0.428 | 2.191 | 0.608 | 9.07 | 17.8 |
| 32 | 200 | 1,450 | 0.003 | 0.001 | 0.600 | 1.450 | 0.800 | 8.3 | 18.0 |
| 33 | 175 | 2,016 | 0.0024 | 0.00094 | 0.420 | 1.895 | 0.584 | 9.2 | 18.3 |
| 34 | 200 | 1,600 | 0.00297 | 0.00103 | 0.594 | 1.64 | 0.800 | 7.2 | 14.8 |
| 35 | 325 | 1,410 | 0.00147 | 0.00094 | 0.478 | 1.33 | 0.784 | 8.3 | 15.2 |
| 36 | 165 | 2,180 | 0.0025 | 0.00107 | 0.412 | 2.33 | 0.587 | 8.45 | 16.6 |
| 37 | 165 | 2,078 | 0.00265 | 0.00094 | 0.437 | 1.96 | 0.592 | 8.9 | 19.3 |
| 38 | 168 | 2,040 | 0.0025 | 0.0011 | 0.420 | 2.24 | 0.605 | 8.5 | 18.6 |
| 39 | 165 | 2,130 | 0.00253 | 0.0010 | 0.418 | 2.13 | 0.582 | 8.9 | 18.8 |
| 40 | 162.5 | 2,170 | 0.0026 | 0.0009 | 0.422 | 1.96 | 0.568 | 9.0 | 19.2 |
| 41 | 142 | 2,570 | 0.0036 | 0.00097 | 0.511 | 2.5 | 0.65 | 10.8 | 20.2 |
| 42 | 139 | 2,403 | 0.00372 | 0.00080 | 0.517 | 1.93 | 0.629 | 10.1 | 20.24 |
| 43 | 160 | 1,760 | 0.00254 | 0.00094 | 0.406 | 1.66 | 0.557 | 12.5 | 21.9 |
| 44 | 140 | 2,295 | 0.00365 | 0.0008 | 0.511 | 1.83 | 0.623 | 11.7 | 21.0 |
| 45 | 140 | 2,020 | 0.0037 | 0.00117 | 0.518 | 2.36 | 0.682 | 11.8 | 22.6 |
| 46 | 180 | 1,880 | 0.00241 | 0.00107 | 0.434 | 2.01 | 0.626 | 6.8 | 16.2 |
| 47 | 325 | 1,400 | 0.00147 | 0.00095 | 0.478 | 1.34 | 0.786 | 7.95 | 15.2 |
| 48 | 200 | 1,280 | 0.003 | 0.0012 | 0.600 | 1.54 | 0.840 | 10.0 | 21.4 |
| 49 | 325 | 1,730 | 0.00147 | 0.00094 | 0.477 | 1.626 | 0.802 | 5.8 | 12.1 |
| 50 | 248 | 2,162 | 0.00156 | 0.00080 | 0.386 | 1.729 | 0.586 | 5.2 | 12.1 |
| 51 | 200 | 1,792 | 0.003 | 0.0011 | 0.600 | 1.971 | 0.820 | 4.8 | 12.1 |
| 52 | 200 | 1,792 | 0.0030 | 0.0010 | 0.600 | 1.792 | 0.800 | 5.1 | 12.4 |
| 53 | 200 | 1,785 | 0.0030 | 0.0010 | 0.600 | 1.785 | 0.800 | 5.65 | 12.6 |
| 54 | 325 | 1,600 | 0.0012 | 0.00091 | 0.390 | 1.456 | 0.686 | 5.6 | 13.15 |
| 55 | 325 | 1,480 | 0.0012 | 0.00087 | 0.390 | 1.287 | 0.673 | 6.7 | 13.5 |
| 56 | 254 | 1,878 | 0.00147 | 0.00084 | 0.373 | 1.577 | 0.586 | 6.25 | 13.8 |
| 57 | 325 | 1,585 | 0.0015 | 0.00101 | 0.487 | 1.600 | 0.647 | 6.65 | 14.0 |
| 58 | 203 | 1,232 | 0.00297 | 0.00137 | 0.604 | 1.686 | 0.882 | 6.3 | 14.1 |
| 59 | 325 | 1,760 | 0.0012 | 0.00085 | 0.390 | 1.497 | 0.666 | 4.9 | 10.9 |
| 60 | 205 | 1,772 | 0.0031 | 0.00122 | 0.636 | 2.160 | 0.885 | 4.7 | 11.4 |
| 61 | 200 | 1,993 | 0.0032 | 0.00107 | 0.640 | 2.130 | 0.854 | 4.1 | 11.5 |
| 62 | 205 | 1,945 | 0.0028 | 0.00126 | 0.574 | 2.45 | 0.831 | 5.9 | 11.4 |
| 63 | 200 | 1,500 | 0.00241 | 0.00121 | 0.482 | 1.815 | 0.726 | 6.05 | 14.2 |
| 64 | 200 | 1,376 | 0.00267 | 0.0014 | 0.534 | 1.925 | 0.814 | 4.4 | 11.8 |
| 65 | 200 | 1,760 | 0.00293 | 0.0011 | 0.586 | 1.935 | 0.806 | 6.65 | 14.4 |
| 66 | 325 | 1,560 | 0.0015 | 0.0009 | 0.488 | 1.405 | 0.780 | 6.5 | 14.2 |

*Examples 67 to 78*

A group of wire mesh was prepared made of stainless steel wire, to a count and wire diameter as noted in Table IV below. These cloths were woven in a Dutch twill weave.

The dirt capacity and means pore diameter of these wire mesh was determined in accordance with the test procedure of Examples 1 to 66, substituting standardized coarse air cleaner (A–C) test dust in the slurry added through the dust valve.

vention. These dirt capacities (with fine dust) range from a minimum of 3.2 g./ft.$^2$ at a pore diameter of 12.5$\mu$ to a maximum of 22 g./ft.$^2$ at a pore diameter of 43$\mu$, and at a 74.3$\mu$ pore diameter the dirt capacity (with coarse dust) is only 22 g./ft.$^2$. In comparison, the wire mesh of the invention, as shown in Table III and IV, have a dirt capacity ranging from 4.2 to 5.7 g./ft.$^2$ at 12.5$\mu$, to from 25 to 36 g./ft.$^2$ at 43$\mu$, and from 27 to 33 g./ft.$^2$ at 74$\mu$.

It is quite remarkable that this increase in dirt capacity can be obtained simply by changing the wire count and/or wire diameter. These increased dirt capacities range from

TABLE IV

| Example Number | $N_w$ | $N_s$ | $D_w$ | $D_s$ | $N_wD_w$ | $N_sD_s$ | $N_w(D_s+D_w)$ | Dirt Capacity (g./ft.$^2$) | Mean Pore Size (Microns) |
|---|---|---|---|---|---|---|---|---|---|
| 67 | 54 | 790 | 0.0075 | 0.00162 | 0.405 | 1.280 | 0.494 | 35.8 | 79.5 |
| 68 | 53 | 885 | 0.0072 | 0.00167 | 0.3816 | 1.478 | 0.470 | 32.4 | 74.4 |
| 69 | 54 | 900 | 0.0070 | 0.0015 | 0.378 | 1.35 | 0.461 | 34.1 | 74.0 |
| 70 | 54 | 920 | 0.00716 | 0.00162 | 0.3866 | 1.490 | 0.473 | 30.2 | 74.4 |
| 71 | 54 | 960 | 0.0071 | 0.0014 | 0.3834 | 1.344 | 0.453 | 28.0 | 68.0 |
| 72 | 58 | 480 | 0.0065 | 0.00268 | 0.377 | 1.286 | 0.532 | 33.0 | 76.6 |
| 73 | 68 | 603 | 0.0054 | 0.00206 | 0.3672 | 1.242 | 0.508 | 28.0 | 68.5 |
| 74 | 69 | 828 | 0.0055 | 0.00165 | 0.3795 | 1.366 | 0.494 | 25.5 | 60.5 |
| 75 | 70 | 425 | 0.00535 | 0.00245 | 0.3745 | 1.0412 | 0.546 | 32.0 | 82.0 |
| 76 | 70 | 535 | 0.0054 | 0.00212 | 0.378 | 1.134 | 0.527 | 35.0 | 80.0 |
| 77 | 70 | 580 | 0.0054 | 0.00256 | 0.378 | 1.485 | 0.557 | 23.8 | 60.0 |
| 78 | 70 | 870 | 0.0055 | 0.00162 | 0.384 | 1.41 | 0.50 | 23.5 | 58.5 |

For purposes of comparison, there is given in Table V a group of Dutch twill weave and square weave wire mesh customarily used for filtration, showing the very considerably lower dirt capacity of these materials. It will be noted that the Dutch twill weave mesh is made to wire counts and wire diameters outside the ranges of the invention. These dirt capacities (with fine dust) range from 15% to 75% greater than the prior art, a very significant improvement. This means that a filter of from ½ to ⁶⁄₇ as large as that now in use will have the same useful life, which means the filter unit can be correspondingly smaller and lighter. This is a particularly useful advantage in aircraft, missile and submarine applications.

TABLE V

| Mesh Sample | $N_w$ | $N_s$ | $D_w$ | $D_s$ | $N_w D_w$ | $N_s D_s$ | $N_w(D_s+D_w)$ | Dirt Capacity (g./ft.$^2$) | Mean Pore Size (Microns) | Type Weave |
|---|---|---|---|---|---|---|---|---|---|---|
| A | 200 | 1,400 | 0.0028 | 0.0016 | 0.56 | 2.24 | 0.88 | 3.2 | 12.5 | Dutch Twill. |
| B | 165 | 1,400 | 0.0028 | 0.0016 | 0.462 | 2.24 | 0.728 | 5.0 | 17.7 | Do. |
| C | 165 | 800 | 0.0028 | 0.0018 | 0.463 | 1.44 | 0.76 | 10.3 | 27.0 | Do. |
| D | 370 | 370 | 0.0012 | 0.0012 | | | | *18.5 | 38.0 | Square Weave. |
| E | 325 | 325 | 0.0014 | 0.0014 | | | | *22.0 | 43.0 | Do. |
| F | 232 | 232 | 0.0014 | 0.0014 | | | | *22.0 | 73.0 | Do. |

*A.C. Coarse Dust.

Figure 13:
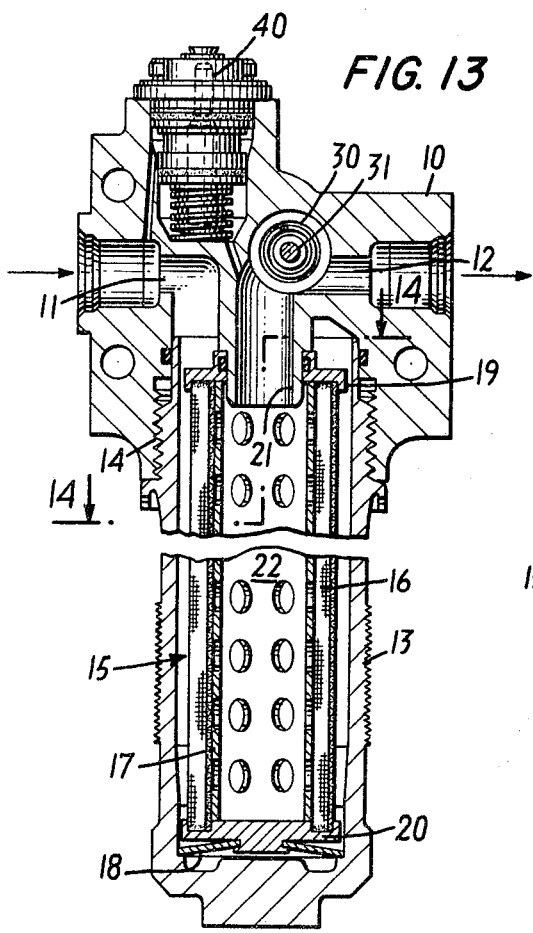
Figure 14:
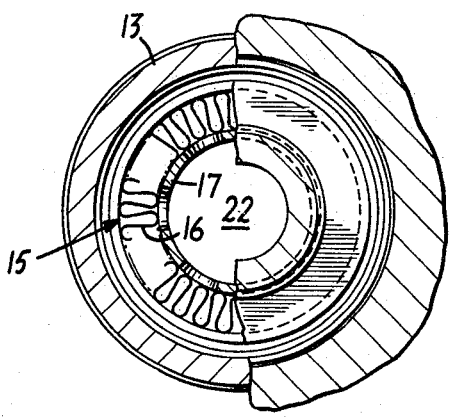

The wire mesh of the invention is especially suited for use as a filter element because of its unusually high dirt capacity. A typical filter unit including a mesh of the invention in a filter element is shown in FIGURES 13 and 14, in which:

FIGURE 13 represents a longitudinal sectional view of such a filter unit and filter element; and FIGURE 14 represents a cross-section taken along the lines 14—14 of FIGURE 13.

The filter unit of FIGURES 13 and 14 comprises a filter housing or head 10 having an inlet passage 11 and an outlet passage 12, opening into a filter bowl 13 which is threadably attached to a dependent portion 14 of the head. Disposed in the bowl 13 in a manner to intercept fluid flow from the inlet 11 to the outlet 12 through the bowl 13 is a filter element 15 composed of a corrugated cylinder of stainless steel wire mesh 16 of the invention and an internal supporting core 17 held between top and bottom end caps 19 and 20, respectively. The top end cap 19 with the biasing action of Belleville spring 18 at the bottom of bowl 13, engages the dependent wall 21 of outlet 12 in a leakproof seal, so that all fluid entering the bowl 13 from inlet 11 can leave the bowl only by passing through the filter element 15.

A by-pass line 30 is provided, with a relief valve 31 arranged to open at a predetermined pressure differential between inlet and outlet passages 11 and 12, to ensure continued fluid flow in the event of clogging of the filter element.

A pressure indicator 40 is provided, also responsive to a predetermined pressure differential between the inlet and outlet passages to indicate a clogged condition of the filter.

Thus, fluid in normal flow enters the head 10 via inlet 11, passes into bowl 13 outside the filter mesh 16, passes through the mesh and core 17 into the open space 22 enclosed thereby, and emerges as filtered flow via outlet 12.

As the filter mesh 16 becomes clogged by the suspended contaminants removed thereby, the pressure differential thereacross rises, and eventually reaches the predetermined value at which the pressure indicator 40 is actuated to show the clogged condition, and the by-pass valve 31 is opened to ensure a continuing supply of fluid to the outlet 12. The filter unit can then be taken out of service, the bowl removed and the filter element replaced.

The filter element as shown is cylindrical, but any form can be used, as well as flat sheets. It can be supplied with any type of fitting to secure it in the housing of the filter unit in a manner to ensure that all fluid flow passes through the filter. It is usually preferable to corrugate or fold the filter sheet to provide maximum surface area in a small space.

Other variations will be apparent to those skilled in the filter art.

The following is claimed:

1. A wire mesh woven of metallic wires in a Dutch twill weave to a warp and shoot wire count and diameter falling within the shaded areas ABCD of FIGURES 1 to 7, inclusive, and having a dirt capacity correlated with pore diameter and falling above the curves EF and GH of FIGURE 8.

2. Woven wire mesh in accordance with claim 1, made of stainless steel wire.

3. Woven wire mesh in accordance with claim 1, wherein the wires are deformed at their points of crossing, so as to have a lesser height and a greater width at those points.

4. Woven wire mesh in accordance with claim 1, having the wires sinter-bonded at their points of crossing.

5. Fluid-permeable metallic filter sheet material in accordance with claim 1, including a layer of metallic powder uniformly united to said sheet material.

6. Fluid-permeable metallic filter sheet material in accordance with claim 1, including fibrous material adhered thereto.

7. Fluid-permeable metallic filter sheet material in accordance with claim 6, wherein the fibrous material impregnates and coats the mesh.

8. Fluid-permeable metallic filter sheet material comprising a continuous homogeneous integral network having a pore system substantially corresponding to a wire mesh fabric woven in a Dutch twill weave, comprising interwoven metallic warp and shoot wires, in contact with each other warp to shoot and shoot to shoot, and having a count and diameter falling within the shaded areas ABCD of FIGURES 1 to 7, inclusive, and defining therebetween a regular system of pore openings of substantially uniform diameter, the material having a dirt capacity correlated with pore diameter and falling above the curves EF and GH of FIGURE 8.

9. Fluid-permeable metallic filter sheet material in accordance with claim 8, wherein the wires are deformed at their points of contact so as to have a lesser height and a greater width at those points to form enlarged portions, extending laterally in the plane of the sheet.

10. Fluid-permeable metallic filter sheet material in accordance with claim 8, wherein the wires are homogeneously and uniformly united by interdiffusion of solid metal from adjacent wires at said points of contact, to form a continuous homogeneous integral piece of metal.

11. Fluid-permeable metallic filter sheet material in accordance with claim 8, wherein the wires are formed of stainless steel.

12. Fluid-permeable metallic filter sheet material in accordance with claim 8, including a metal sheet uniformly united to said sheet material.

13. Fluid-permeable metallic filter sheet material in accordance with claim 8, in which the wires, in at least one of the faces of the material, are sufficiently flattened to establish tight lateral abutment of such wires about each of the pores, forming a substantially flat continuous metallic surface on that face, the surface being pierced by the pores.

14. Fluid-permeable metallic filter sheet material in accordance with claim 13, the laterally-abutting flattened portions being uniformly united by interdiffusion of metal from adjacent wires.

15. A filter unit comprising, in combination, a housing, a fluid inlet and a fluid outlet therein, and, disposed across the line of flow between the inlet and the outlet in a manner to intercept fluid flowing therebetween, a metallic filter sheet material in accordance with claim 8.

16. A filter unit in accordance with claim 15, wherein the wires of the metallic filter sheet are sinter-bonded at their points of contact.

17. A filter element comprising, in combination, a metallic filter sheet material in accordance with claim 8, and a fitting attached thereto in a leakproof manner enabling the sheet to be located in a filter unit to intercept and filter fluid flowed therethrough.

18. A filter element in accordance with claim 17 wherein the filter sheet is in cylindrical form and the fitting is in the form of an end cap disposed across an open end of the cylinder.

References Cited

UNITED STATES PATENTS

| | | | |
|---|---|---|---|
| 2,423,547 | 7/1947 | Behlen | 210—499 |
| 2,425,235 | 8/1947 | Ferrante | 210—499 X |
| 2,457,051 | 12/1948 | Le Clair. | |
| 2,775,550 | 12/1956 | Harlow | 210—499 X |
| 3,007,579 | 11/1961 | Pall | 210—493 X |

FOREIGN PATENTS

| | | |
|---|---|---|
| 417,707 | 10/1934 | Great Britain. |

REUBEN FRIEDMAN, *Primary Examiner.*

F. MEDLEY, *Assistant Examiner.*